J. R. REYBURN.
CHAIN CONNECTING DEVICE.
APPLICATION FILED JULY 11, 1917.
1,296,218.
Patented Mar. 4, 1919.
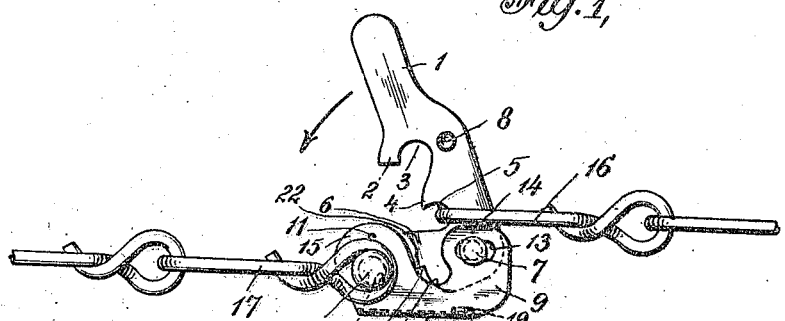
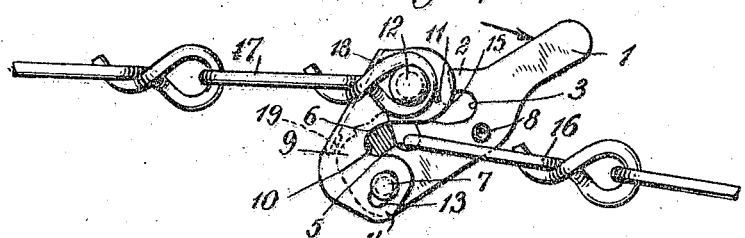
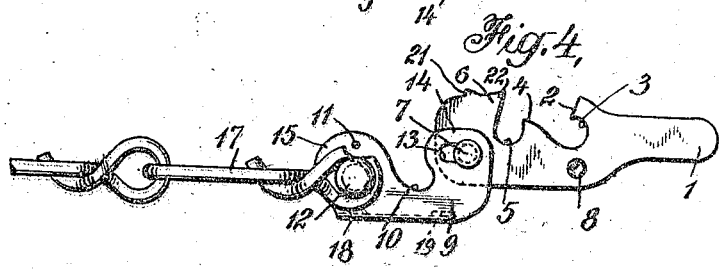
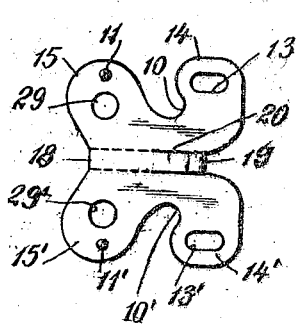
Inventor
John R Reyburn
By his Attorney
Harry L Duncan

UNITED STATES PATENT OFFICE.

JOHN R. REYBURN, OF FAIRFIELD, CONNECTICUT, ASSIGNOR TO AMERICAN CHAIN COMPANY, INCORPORATED, OF BRIDGEPORT, CONNECTICUT, A CORPORATION OF NEW YORK.

CHAIN-CONNECTING DEVICE.

1,296,218.

Specification of Letters Patent.   Patented Mar. 4, 1919.

Application filed July 11, 1917.   Serial No. 179,824.

*To all whom it may concern:*

Be it known that I, JOHN R. REYBURN, a citizen of the United States, and resident of Fairfield, county of Fairfield, State of Connecticut, have made a certain new and useful Invention Relating to Chain-Connecting Devices, of which the following is a specification, taken in connection with the accompanying drawing, which forms part of the same.

This invention relates especially to the lever type of chain connecting hooks or devices in which the lever or other form of connector is provided with recesses to accommodate and directly engage the free end of the chain and is also formed with a stud or other securing device directly connected to the other end of the chain so as to form a direct pull connector when the device is closed. A coöperating retainer member may be permanently secured to one end of the chain through the stud or rivet referred to, for instance, and this retainer, which may be in the form of a sheet metal cover more or less inclosing or embracing the connector member, may have a loose pin and slot connection therewith so that these two members are pivotally and also longitudinally movable with respect to each other. One of the recesses in the connector member may be a locking recess adapted to interlock with the stud or securing member when the device is in its closed position and one or more other connector recesses may be provided to accommodate a link in the free end of the chain, this recess being sufficiently closed to prevent withdrawal of the link therefrom when the connector device is closed. By using a plurality of such connector recesses to accommodate the chain links a finer adjustment is secured, these connector recesses being spaced apart a half or a third of the link length as is customary. To promote the longitudinal movement of the connector and retainer members during their closing pivotal movement, the lever connector may be formed with a locking hook having a flaring alining face adjacent the locking recess in this member so that this flaring face may engage the retainer stud and move the parts longitudinally more or less and thus secure alinement as the closing proceeds. If desired, however, there may be used either in addition to or instead of this alining device a connector heel adjacent the pin and slot connection between these parts, which may more or less engage the coöperating member of the retainer into which it may project, so that any resistance here encountered tends to move the members longitudinally during their angular closing movement. This action may, if desired, be further promoted by the use of definite interlocking members on this heel and retainer which may interlock or engage during this alining closing movement and be preferably automatically released when the locking recess is in substantial engagement with the coöperating retainer stud so that the two members may then move longitudinally and be more definitely retained in locked position.

In the accompanying drawings showing in a somewhat diagrammatic way an illustrative embodiment of this invention, Figure 1 is an elevation showing the connector device during the closing movement of the lever connector as indicated by the arrow.

Fig. 2 shows the device in its closed or locked position.

Fig. 3 shows the device during its opening movement indicated by the arrow.

Fig. 4 shows the fully opened device; and

Fig. 5 shows the blank for the cover retainer before it is bent or formed up.

The connector member which may be of the lever type may be formed of rather stiff sheet steel or other suitable metal about an eighth of an inch thick, more or less, and this connector 1 may have the extended lever handle indicated in Fig. 1 by which it may be conveniently closed and opened. This connector is preferably provided with a locking recess, such as 3, having the adjacent connector hook 2 to hold the parts in locked position and the connector may also be formed with one or more connector recesses 5 with which the chain links 16 on the free end of the chain may be engaged. The coöperating retainer member which may have a loose or pin and slot connection of any desired character with the connector, may be of any suitable form and construction adapted to prevent disengagement of the chain link from the connector recess when the parts are closed or swung together and may comprise any suitable securing device, such as the retainer stud or headed rivet 12, which may with advantage be directly and permanently secured to one end of the chain and with which the locking recess is adapted to coöperate to hold the members in locked or closed position. If desired, the retainer member may be in the form of a sheet metal cover 9 more or less inclosing the connector member and having a loose or pin and slot connection therewith at one end which may be conveniently effected by forming the retainer slots 13 in the ends or projections 14 of the retainer cover through which may pass the connector pin 7 coöperating with the end of the connector lever and having headed ends formed outside the retainer cover to keep these parts more definitely in the desired position. This arrangement is desirable because it more definitely insures the desired longitudinal movement between the connector and retainer under service conditions, since the slots in the relatively thin retainer member are thus more nearly self-clearing, dirt, etc., being more readily disengaged, than from a slot in the inner connector member.

When the chain link 16 is inserted in the connector recess 5 and the connector swung over in the direction indicated by the arrow in Fig. 1, the heel 6 of the connector which may be so formed thereon as to project into the retainer adjacent its back or connecting web 18 may engage this web or frictionally engage the adjacent sides of the retainer so that toward the end of the closing movement the contact is very largely at this point and a longitudinal self-alining movement of the connector and retainer is thus secured, the connector pin 7 thus moving in the slots 13 which makes the connector hook slip over the retainer stud or securing member, although, of course, this alining or locking movement of the parts may be manually secured, if desired. In some cases it is desirable also to secure a more definite alining action between the connector and retainer which may be done by forming interlocking alining devices on these parts, such, for instance, as the alining notch 21 which may be formed on the heel 6 of the connector, preferably substantially below or opposite the connector pin. This alining notch may coöperate with an alining catch or device of any suitable character on the retainer, such, for instance, as the alining catch 19, which may be conveniently formed by doubling back the end of a tongue 20 formed on the web 18, for instance, so that during the closing movement these parts engage and definitely interlock so that the connector is moved longitudinally to insure the proper alinement of the parts. And then when the final closing movement occurs and the members are brought into alinement a releasing tip, such as 22, engages the spring tongue 20 and forces it downward so as to automatically disengage the alining catch from the notch and thus allow these two members to move into their locked position shown in Fig. 2 in which the connector hook 2 is sufficiently locked around the retainer stud 12 to prevent disengagement. This alining action may also be promoted by forming the connector hook 2 with a flaring or angularly arranged alining face so that it will engage and ride over the retainer stud and this alining device may of course be used in addition to or instead of the other alining means referred to. It is sometimes desirable to employ a spring detent device to assist in holding the parts in closed or locked position and for this purpose one or more detent sockets, such as 8, may be formed on the connector, for instance, so as to be engaged by the inwardly projecting spring detent lugs 11 on the retainer when the members are in the closed position shown in Fig. 2.

As indicated the connecting device may be readily riveted or otherwise permanently secured to one end of the chain and where the end links, such as 17, are of the double eye type the securing stud 12 may pass through the holes 29 in the retainer cover so as to secure the chain end thereto by the enlarged or headed over ends of this securing device. This securing device may thus pivotally secure this end link to each side of the retainer cover, leaving free the usual open space in the center of the link so as to accommodate the end of the lever connector 1. In this closed position therefore, the device is neat in appearance and does not undesirably project beyond the chain so as to be especially adapted for use in connecting the circumferential or side chains of the Weed type chain tire grips. The device may be disengaged by longitudinally moving the two members sufficiently to disengage the locking devices thereof and then swinging the members open. This may be conveniently done in practically a single movement by swinging the end of the lever connector 1 around as indicated by the arrow in Fig. 3, so that when reaching some such position as illustrated the tension of the chain and the pull on the end of the connector causes longitudinal movement of these members so as to disengage the locking hook 2 from the securing stud 12 and allow the free opening movement of the coöperating members which may then swing fully open into some such position as indicated in Fig. 4. Fig. 5 indicates in somewhat greater detail the shape of the sheet metal blank from which the cover retainer may be formed of rather thin sheet steel or other material of preferably fairly resilient springy character which is desirable for this part of the device. As indicated the blank may be stamped out with the slots 13, 13' in the ends 14, 14', the ears 15, 15' at the other end of the blank being formed with the holes 29, 29' to accommodate the securing member or stud and the detent lugs 11, 11' being preferably formed at this stage of the operation. The web 18 is shown as dotted along the lines on which it is folded and the separated tongue 20 and alining catch 19, which may, if desired, be formed from the tongue may have about the shape and position indicated. The retainer recesses 10, 10' in the retainer blank are preferably so shaped that as indicated in Figs. 1 and 2 they are substantially in line with the connector recess 5 when the members are in closed or locked position, sufficient clearance being preferably allowed, so that all or practically all of the strain of the chain links comes directly on the connector member and not on the relatively thinner and lighter retainer member, the principal function of which is to hold the chain links in proper position in the connector.

This invention has been described in connection with a number of illustrative embodiments, forms, parts, proportions of materials, devices, and methods of manufacture and use, to the details of which disclosure the invention is not of course to be limited, since what is claimed as new and what is desired to be secured by Letters Patent is set forth in the appended claims:

1. The connector device adapted to detachably connect the ends of the circumferential side chains of a chain tire grip and which comprises a lever connector member formed with a locking recess and with an adjacent projecting connector hook and formed with a connector pin and with a connector recess between said pin and said locking recess and adapted to accommodate a link at the free end of the chain, and a coöperating U sectioned cover retainer member formed of relatively thin resilient sheet metal and provided with a transversely extending securing device adapted to permanently secure thereto the eyes of a link at the other end of said chain, said retainer member being formed with a slot accommodating said pin to form a loose pin and slot connection between said retainer member and said connector member and render said members pivotally and longitudinally movable with respect to each other and enable said connector hook to slip over said securing device and lock said securing device in said locking recess, said retainer being formed with retainer recesses allowing the connecting strains of the end chain link in said connector recess to be substantially borne by said connector member.

2. The connector device adapted to detachably connect the ends of the circumferential side chains of a chain tire grip and which comprises a lever connector member formed with a locking recess and with an adjacent projecting connector hook and formed with connector means and with a connector recess between said means and said locking recess and adapted to accommodate a link at the free end of the chain, and a coöperating U sectioned cover retainer member provided with a securing device adapted to permanently secure thereto a link at the other end of said chain, said retainer member being formed with a slot accommodating said connector means to form a loose pin and slot connection between said retainer member and said connector member and render said members pivotally and longitudinally movable with respect to each other.

3. The connector device adapted to detachably connect the ends of the circumferential side chains of a chain tire grip, and which comprises a lever connector member formed with a connector hook and formed with a connector recess to accommodate a link at the free end of the chain, and a coöperating retainer member provided with a transversely extending securing device adapted to permanently secure thereto a link at the other end of said chain, a loose pin and slot connection between said retainer member and said connector member comprising a connector pin and slots in said retainer member to render said members pivotally and longitudinally movable with respect to each other and enable said connector hook to slip over said securing device and lock said members in closed position, an alining catch formed on said retainer member to coöperate with an alining notch on said connector member substantially opposite the pin therein and cause longitudinal alining movement of said members during their angular closing movement and a releasing tip on said connector member to automatically disengage said alining catch and notch when said closing movement is substantially completed.

4. The connector device adapted to detachably connect the ends of the circumferential side chains of a chain tire grip, and which comprises a lever connector member formed with a connector hook, and a coöperating retainer member, a loose pin and slot connection between said retainer member and said connector member to render said members pivotally and longitudinally movable with respect to each other and enable said connector hook to lock said members in closed position, an alining catch formed on said retainer member to coöperate with an alining notch on said connector member substantially opposite the pin therein and cause longitudinal aligning movement of said members during their angular closing movement and a releasing tip on said connector member to automatically disengage said alining catch and notch when said closing movement is substantially completed.

5. The connector device adapted to detachably connect the ends of the circumferential side chains of a chain tire grip, and which comprises a lever connector member formed with a connector hook, and a coöperating retainer member, a loose pin and slot connection between said retainer member and said connector member to render said members pivotally and longitudinally movable with respect to each other and enable said connector hook to lock said members in closed position, interlocking alining devices to cause longitudinal alining movement of said members during their angular closing movement and a releasing device to automatically disengage said alining devices when said closing movement is substantially completed.

6. The chain connector device which comprises a connector member formed with a locking hook and with a recess adapted to accommodate a chain link and a coöperating cover retainer member substantially embracing one end of said connector member and having a loose pin and slot connection therewith to render said members pivotally and longitudinally movable with respect to each other and enable said locking hook to have locking engagement with said retainer member when said members are swung into closed position, a securing device connected to said retainer member and adapted to permanently connect a chain thereto and with which said locking hook is held in engagement by the strain of the chain link in the connector recess.

JOHN R. REYBURN.

Witnesses:
HARRY H. SNYDER,
FRANCIS T. PENDLETON.